United States Patent
Hamada

(10) Patent No.: US 8,098,318 B2
(45) Date of Patent: Jan. 17, 2012

(54) VIDEO REPRODUCTION APPARATUS, DIGITAL CAMERA, SEMICONDUCTOR INTEGRATED CIRCUIT, AND METHOD FOR VIDEO REPRODUCTION

(75) Inventor: Masao Hamada, Fukuoka (JP)

(73) Assignee: Panasonic Corporation, Osaka (JP)

( * ) Notice: Subject to any disclaimer, the term of this patent is extended or adjusted under 35 U.S.C. 154(b) by 405 days.

(21) Appl. No.: 12/524,238

(22) PCT Filed: Nov. 11, 2008

(86) PCT No.: PCT/JP2008/003258
§ 371 (c)(1),
(2), (4) Date: Jul. 23, 2009

(87) PCT Pub. No.: WO2009/069254
PCT Pub. Date: Jun. 4, 2009

(65) Prior Publication Data
US 2010/0026849 A1    Feb. 4, 2010

(30) Foreign Application Priority Data

Nov. 27, 2007   (JP) .................. 2007-305407

(51) Int. Cl.
H04N 5/222 (2006.01)
(52) U.S. Cl. .................................. 348/333.11
(58) Field of Classification Search ............. 348/207.99, 348/222.1, 231.2, 231.3, 234, 333.01, 333.05, 348/333.11
See application file for complete search history.

(56) References Cited

U.S. PATENT DOCUMENTS

| | | | |
|---|---|---|---|
| 5,541,640 A * | 7/1996 | Larson | 348/14.15 |
| 5,821,987 A * | 10/1998 | Larson | 348/14.15 |
| 7,253,836 B1 | 8/2007 | Suzuki et al. | |
| 2003/0179299 A1 * | 9/2003 | Okada | 348/222.1 |
| 2004/0046880 A1 * | 3/2004 | Kawakubo | 348/272 |
| 2004/0126019 A1 | 7/2004 | Ikebe et al. | |
| 2005/0213812 A1 | 9/2005 | Ishikawa et al. | |
| 2006/0164519 A1 * | 7/2006 | Kaku | 348/222.1 |
| 2007/0252903 A1 | 11/2007 | Tsuda | |

(Continued)

FOREIGN PATENT DOCUMENTS

JP    2001-045427    2/2001

(Continued)

OTHER PUBLICATIONS

International Search Report issued Feb. 24, 2009 in the International (PCT) Application of which the present application is the U.S. National Stage.

(Continued)

*Primary Examiner* — Nicholas Giles
(74) *Attorney, Agent, or Firm* — Wenderoth, Lind & Ponack, L.L.P.

(57) ABSTRACT

The decode control unit (103) has control over a video decode unit (101) so as to cause the video decode unit (101), which decoded images obtained from respective normal coded data items and high-speed coded data items, to start decoding of some of the normal coded data items with timings which are ahead of predetermined timings so that the video decode unit (101) starts decoding of the beginning one of the high-speed coded data items with a timing which is ahead of a predetermined timing by a period of time necessary for the display unit (105) to display the images sequentially.

7 Claims, 12 Drawing Sheets

U.S. PATENT DOCUMENTS

2007/0263090 A1* 11/2007 Abe .................. 348/148
2007/0268379 A1  11/2007 Suzuki et al.

FOREIGN PATENT DOCUMENTS

| JP | 2003-125209 | 4/2003 |
| JP | 2003-153158 | 5/2003 |
| JP | 2004-128583 | 4/2004 |
| JP | 2005-286415 | 10/2005 |
| JP | 2006-033496 | 2/2006 |

OTHER PUBLICATIONS

T. Takahashi et al., "*Kogashitsu MPEG-4 Hoshiki Digital Movie Camera* (MPEG-4 Digital Movie Camera)", Sanyo Technical Review, vol. 37, No. 1, Jun. 2005, pp. 12-20 (with partial English translation).

* cited by examiner

FIG. 1

| R | G | R | G | R | G |
|---|---|---|---|---|---|
| G | B | G | B | G | B |
| R | G | R | G | R | G |
| G | B | G | B | G | B |
| R | G | R | G | R | G |
| G | B | G | B | G | B |

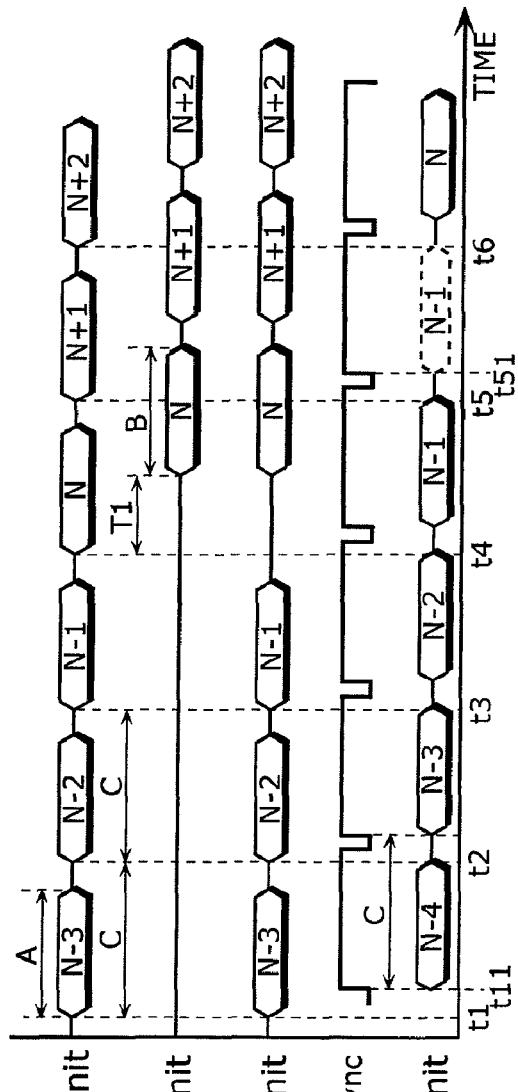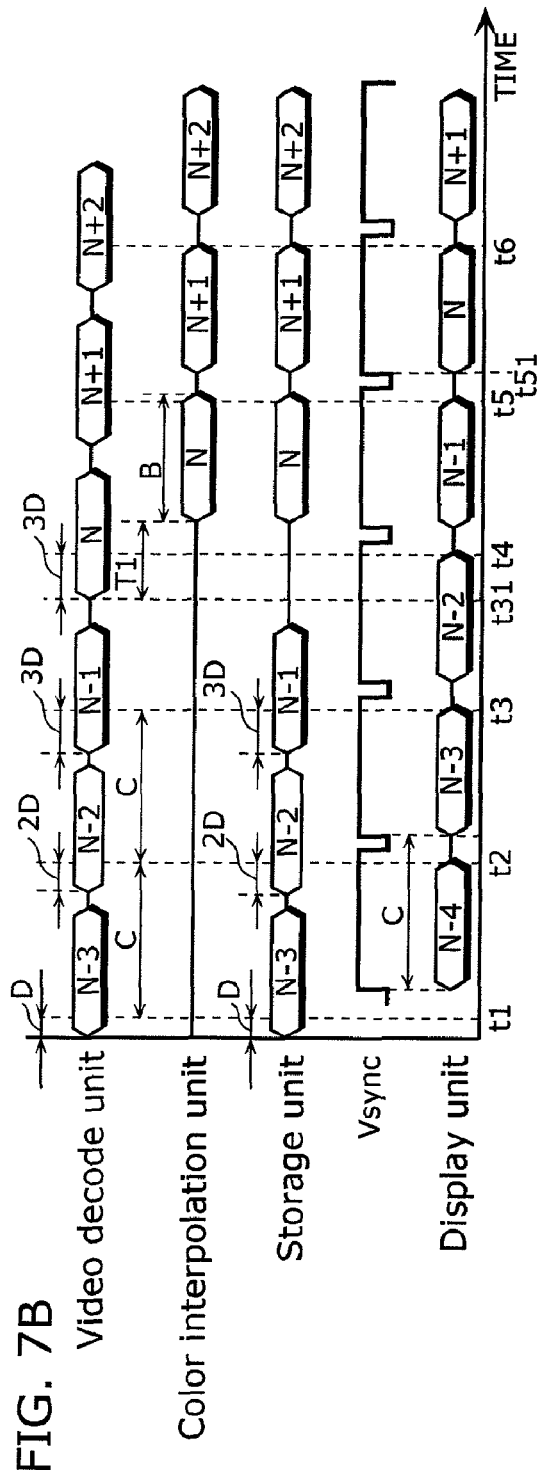

VIDEO REPRODUCTION APPARATUS, DIGITAL CAMERA, SEMICONDUCTOR INTEGRATED CIRCUIT, AND METHOD FOR VIDEO REPRODUCTION

TECHNICAL FIELD

The present invention relates to video reproduction apparatuses, digital cameras, semiconductor integrated circuits, and a method for video reproduction. More specifically, the present invention relates to a video reproduction apparatus, a digital camera, a semiconductor integrated circuit which reproduce two temporally continuous coded video data items obtained by normal photography and high-speed photography, and a method for reproducing the same.

BACKGROUND ART

In these years, digital video compression is applied more and more widely because of advances in technology of digital video compression and transition from analog recording to digital recording in the field of video compression. For video recoding media, DVDs and Blu-ray Discs (BDs) are used. For recording a video on a hard disk drive, the video is usually compressed using video compression techniques, such as the technique of the Moving Picture Experts Group (MPEG)-2 standard. These days, the technique of the H.264 (MPEG-4 AVC) is also used for video compression. At the same time, the techniques of the MPEG-4 and the H.264 are used as techniques for video compression in video shooting. Such techniques of the MPEG-4 and the H.264 are also used with home appliances such as digital video cameras and digital still cameras.

On the other hand, manufacturers differentiate their digital video cameras with new functions for video shooting in addition to normal photography, such as a mode for shooting in the dark. One of techniques for such new functions is a technique of high-speed photography. Video cameras which support high-speed photography (hereinafter referred to as high-speed photographic cameras) have already existed. However, such high-speed photographic cameras are expensive products because they tend to be costly due to pursuit of frame rates for shooting. Because of this, such high-speed photographic cameras have been used mainly in some specialized fields. Some specific techniques are used in order to incorporate techniques of high-speed photography into home appliances such as digital video cameras and digital still cameras. For example, one of the specific techniques is used for shooting videos with digital video cameras or digital still cameras at a frame rate lower than required for specialized fields. Owing to this, the cost for digital video cameras and digital still cameras are kept within the range of the cost adequate for home appliances.

Here is a flow of a signal in shooting a video using a digital video camera or a digital still camera. First, an image sensor having light-receiving elements, such as a charge coupled device (CCD) image sensor or a complementary metal oxide semiconductor (CMOS) image sensor converts light to electricity. At this time, as light-receiving elements lack capability for color discrimination, a color filter is provided for each of the light-receiving elements in order to achieve color imaging.

Providing a color filter of three primary colors with each pixel would make the elements larger in size. Thus, the light-receiving elements of the image sensor are usually arranged in the Bayer arrangement. In the Bayer arrangement, each pixel is assigned one of the primary colors. FIG. 1 shows an example of the Bayer arrangement.

Signal data of colors of the light received by the light-receiving elements arranged in the Bayer arrangement is referred to as RAW data. A full-color image is generated by demosaicing the RAW data. Demosaicing is a process for converting RAW data of a pixel into data in RGB three primary colors by performing color interpolation using the RAW data of the pixel and pixels round the pixel (see Patent Reference 1, for example). RAW data may be converted not to data in RGB three primary colors but directly to YUV data in YUV format which is appropriate for video compression.

Since RAW data is used as a base data for interpolation, the RAW data of red, green, and blue has a large resolution in comparison with data of red, green, and blue after color interpolation, respectively. For example, data of red after color interpolation has a resolution of 8 bits, whereas RAW data of red has a resolution of 12 bits.

An image in RGB format after color interpolation or an image in YUV format (hereinafter referred to as a YUV image) is compressed as a video and then recorded on recording media. Reproduction apparatuses reproduce (or decode) the compressed video and convert it to in videos in image formats appropriate for display units (see Non-patent Reference 1).

In a high-speed photographic camera, processing time per frame for high-speed photography is so short that a period of time for processing RAW data outputted from an image sensor and compressing a video is very short. RAW data is processed in such a short period of time that the peak of power consumption per unit time is high. This requires reinforcement of power supply to support such a high peak of power consumption per unit time, resulting in increase in the cost for the high-speed photographic camera. The power of the high peak generates more heat and thus the high-speed photographic camera needs a countermeasure against the heat for the entire body.

Direct compression of RAW data, which will reduce processing load, may be counted as the countermeasure. Techniques for direct compression of RAW data are often used for shooting still images (see Patent References 2, 3). When coded data obtained by high-speed photography is reproduced, images are reproduced in slow motion. The period of time for processing RAW data per frame is longer for reproduction in slow motion than for high-speed photography. This will reduce the peak power.

[Patent Reference 1] Japanese Unexamined Patent Application Publication No. 2004-128583
[Patent Reference 2] Japanese Unexamined Patent Application Publication No. 2005-286415
[Patent Reference 3] Japanese Unexamined Patent Application Publication No. 2003-125209
[Non-patent Reference 1]"Kogashitsu MPEG-4 Hoshiki Digital Movie Camera" (Sanyo Denki Giho (Sanyo Technical Review) Vol. 37, No. 1, June 2005, the 76th volume of the set, P. 16)

DISCLOSURE OF INVENTION

Problems that Invention is to Solve

A high-speed photographic camera is used in a variety of ways. For example, it is assumed that an instant when a runner is crossing a finish line needs to be reproduced in slow motion in the case where a high-speed photographic camera is used for shooting a track and field event. In this case, it is presumable that the runner is shot, using the high-speed photographic camera, at a normal speed when starting and then at a high speed when approaching the finish line. In this case, in order to reduce increase in image processing load and peak power, the high-speed photographic camera performs video compression on YUV images in the normal photography, and direct compression on RAW data after switching to the high-speed photography (hereinafter referred to as low-power high-speed photography).

Coded data of the normal photography and coded data of the high-speed photography recorded in the low-power high-speed photography are temporally continuous. Thus, the coded data of the normal photography and the coded data of the high-speed photography need to be reproduced continuously.

The coded data of the normal photography is decoded into YUV images. On the other hand, the coded data of the high-speed photography is decoded into RAW data. The RAW data resulting from the decoding needs color interpolation to be converted into YUV images. Considering a period of time from the start of the decoding to displaying, the coded data of the high-speed photography requires long time for color interpolation in comparison with the coded data of the normal photography. In this case, when decoding of the coded data of each frame of the high-speed photography and decoding of the coded data of each frame of the normal photography is started with the same timing, the first image (frame) based on the high-speed photography may be displayed on a display unit behind a predetermined point of time. This means that the first image (frame) based on the coded data of the high-speed photography may not be displayed. In other words, there is a problem that a video based on coded data of one type and coded data of the other type loses temporal continuity therebetween and is not reproduced seamlessly.

In this case, a user watching the reproduced video displayed on the display unit finds an interruption in the temporal continuity at a switching point between the normal photography and the high-speed photography with a feeling of unpleasantness.

The present invention, conceived to address the problem, has an object of providing a video reproduction apparatus, etc. which seamlessly reproduce a video based on coded data of two different types without losing temporal continuity.

Means to Solve the Problems

In order to address the problem, the video reproduction apparatus according to an aspect of the present invention reproduces a video using first coded data items and second coded data items, the first coded data items being YUV data items obtained by performing color interpolation of respective RAW data items and then individually coded, the respective RAW data items obtained from an imaging device, and the second coded data items being the RAW data items individually coded. The video reproduction apparatus includes: a decode unit which decodes the first coded data items and subsequently the second coded data items; a storage unit in which data is stored; a color interpolation unit which converts a RAW data item to a YUV data item; a display unit which displays updated images at predetermined intervals; and a control unit which controls timings with which the decode unit starts the decoding. The timings with which the decoding of the respective first coded data items is started are predetermined; the timings with which the decoding of the respective second coded data items is started are predetermined; the control unit has control over the decode unit so as to cause the decode unit to start the decoding of a part of the first coded data items with timings brought forward ahead of the predetermined timings so that the decode unit starts the decoding a beginning one of the second coded data items with a timing which is ahead of corresponding one of the predetermined timings by a time necessary for display, the time necessary for display being a period of time necessary for the display unit to seamlessly display images obtained from the respective first coded data items and the respective second coded data items; the decode unit sequentially decodes the first coded data items under the control of the control unit, stores the YUV data items in the storage unit in an order of the decoding, and sequentially decodes the second coded data items, the YUV data items being obtained by the decoding; the color interpolation unit converts the RAW data items to YUV data items and stores the YUV data items in the storage unit in an order of the converting, the RAW data items being obtained by the sequential decoding of the second coded data items; and the display unit displays images that are based on the respective YUV data items stored in the storage unit in an order of the storing of the YUV data items corresponding to the images in the storage unit.

Specifically, the control unit has control over the decode unit so as to cause the decode unit to start the decoding of a part of the first coded data items with timings brought forward ahead of the predetermined timings so that the decode unit starts the decoding a beginning one of the second coded data items with a timing which is ahead of corresponding one of the predetermined timings by a time necessary for display, the time necessary for display being a period of time necessary for the display unit to seamlessly display images obtained from the respective first coded data items and the respective second coded data items. The decode unit sequentially decodes the first coded data items under the control of the control unit, stores the YUV data items in the storage unit in an order of the decoding, and sequentially decodes the second coded data items, the YUV data items being obtained by the decoding. The color interpolation unit converts the RAW data items to YUV data items and stores the YUV data items in the storage unit in an order of the converting, the RAW data items being obtained by the sequential decoding of the second coded data items. The display unit displays images that are based on the respective YUV data items stored in said storage unit in an order of the storing of the YUV data items corresponding to the images in said storage unit.

In other words, starting decoding of a part of the plurality of first data items is brought forward by a time necessary for display which is a period of time necessary for the display unit to seamlessly display images obtained from the respective first coded data items and the respective second coded data items.

Thus, images obtained from each of the first coded data items and the second coded data items are displayed seamlessly and continuously. This means that it is possible to seamlessly reproduce video based on coded data of two different types without losing temporal continuity. This prevents a user watching the video from feeling unpleasantness while the video being reproduced is based on the coded data of two different types.

Effects of the Invention

The present invention makes it possible to reproduce a video based on coded data of two different types seamlessly without loosing temporal continuity. This prevents a user watching the video from having unpleasantness while the video based on the coded data of two different types is reproduced.

BRIEF DESCRIPTION OF DRAWINGS

FIG. 1 shows an example of the Bayer arrangement.

FIG. 7A is a timing chart showing the case where normal photographic coded data NSD and high-speed photographic coded data HSD are reproduced continuously without adjustment processing A.

FIG. 7B is a timing chart showing the case where the normal photographic coded data NSD and the high-speed photographic coded data HSD are reproduced back continuously with the adjustment processing A.

NUMERICAL REFERENCES

Figure 2:
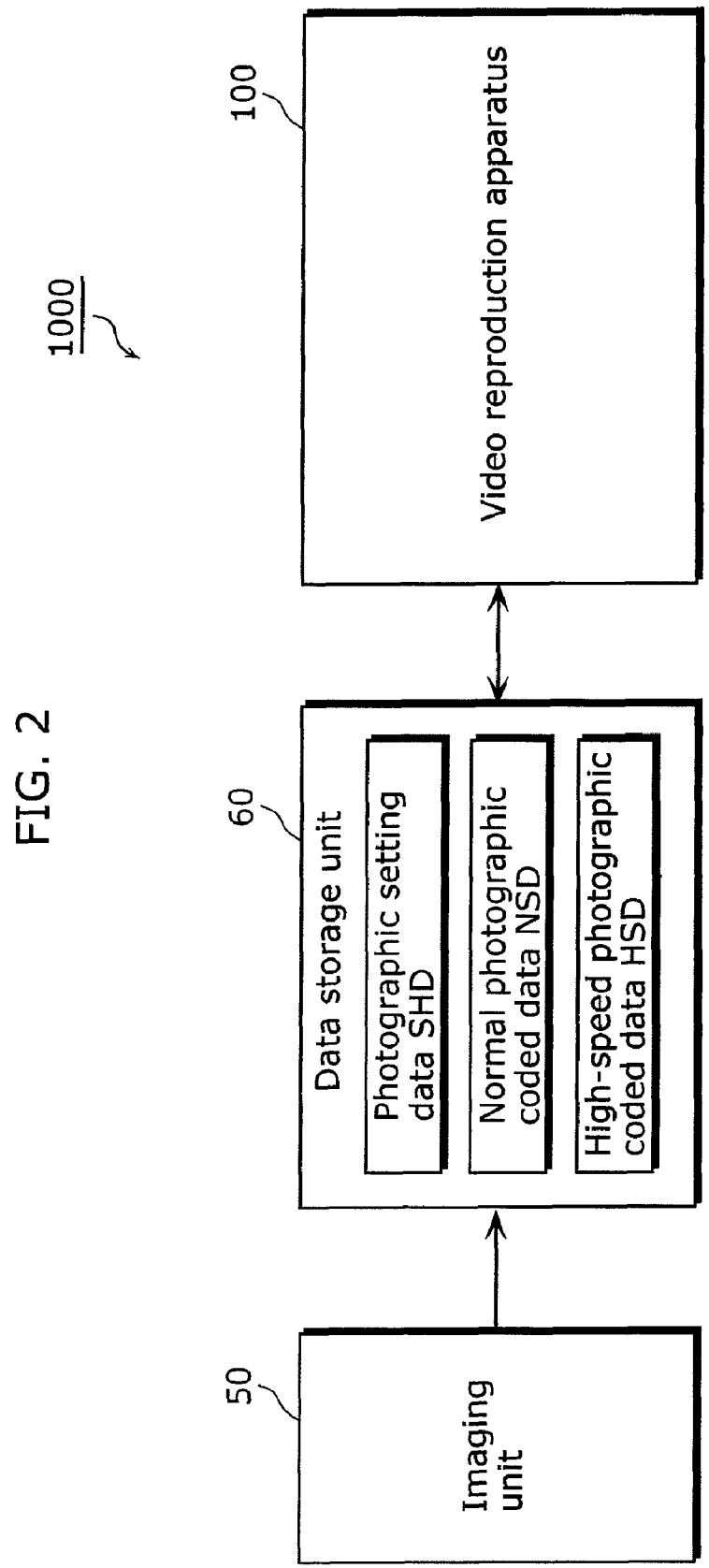
FIG. 2 is a block diagram showing a configuration of a photography apparatus according to the first embodiment.

60 Data storage unit
100 Video reproduction apparatus
101 Video decode unit
102 Color interpolation unit
103 Decode control unit
104 Storage unit
105 Display unit
1000 Photography apparatus

BEST MODE FOR CARRYING OUT THE INVENTION

First Embodiment

Hereinafter, embodiments according to the present invention are described with reference to figures.

FIG. 2 is a block diagram showing a configuration of a photography apparatus 1000 according to the first embodiment. The photography apparatus 1000 is a digital video camera or a digital still camera with a video shooting function. The photography apparatus 1000 is not limited to a digital video camera or a digital still camera. The photography apparatus 1000 may be any apparatus with a video shooting function.

Furthermore, the photography apparatus 1000 is provided with a photographic mode for shooting a video at a normal speed (hereinafter referred to as normal photographic mode) and a photographic mode for shooting a video at a high speed (hereinafter referred to as high-speed photographic mode). For example, a video shot in normal photographic mode is composed of still images (frames) captured every 1/60 second. For example, a video shot in high-speed photographic mode is composed of still images (frames) captured every 1/300 second.

As shown in FIG. 2, the photography apparatus 1000 includes an imaging unit 50, a data storage unit 60, and a video reproduction apparatus 100.

The data storage unit 60 is a memory in which data is stored.

The imaging unit 50 includes an image sensor not shown. The imaging unit 50 performs photographic processing by capturing an object using the image sensor in normal photographic mode or high-speed photographic mode, and then codes data resulting from the photographic processing.

When performing the photographic processing in normal photographic mode, the imaging unit 50 converts a plurality of RAW data items obtained from the image sensor to a plurality of YUV data items by performing color interpolation (demosaicing) on each of the plurality of RAW data items. The imaging unit 50 then generates coded data (hereinafter referred to as normal photographic coded data) by coding the plurality of YUV data items. Subsequently, the imaging unit 50 stores the normal photographic coded data in the data storage unit 60.

The normal photographic coded data includes a plurality of items of the coded data that provide a plurality of frames to form a video. Hereinafter, the items of the coded data included in the normal photographic coded data are referred to as normal coded data items. The normal coded data items are decoded into YUV data items. Each of the plurality of normal coded data items included in the normal photographic coded data has a preset timing (hereinafter referred to as a predetermined timing) with which decoding is started.

When performing the photographic processing in high-speed photographic mode, the imaging unit 50 generates coded data (hereinafter referred to as high-speed photographic coded data) by coding the plurality of RAW data items obtained from the image sensor. The imaging unit 50 stores the high-speed photographic coded data in the data storage unit 60.

Photographic processing in high-speed photographic mode takes much shorter time for processing each of the RAW data items than photographic processing in normal photographic mode. When the imaging unit 50 performs color interpolation in such a short time, power consumption per unit time increases. The increase in power consumption per unit time necessitates power reinforcement, which leads to increase in cost of the apparatus. Because of this, the imaging unit 50 does not perform color interpolation (demosaicing) on the plurality of RAW data items in order to limit the power consumption per unit time.

The high-speed photographic coded data includes a plurality of items the coded data that provide a plurality of frames to form a video. Hereinafter, the items of the coded data included in the high-speed photographic coded data are referred to as high-speed coded data items. The high-speed coded data items are decoded into RAW data items. Each of the plurality of high-speed coded data items included in the high-speed photographic coded data has a preset timing (hereinafter referred to as a predetermined timing) with which decoding is started.

According to the first embodiment, it is assumed that photographic processing in normal photographic mode is switched to photographic processing in high-speed photographic mode in the photography apparatus 1000. In this case, the data storage unit 60 stores normal photographic coded data and high-speed photographic coded data. Furthermore, when the photography apparatus 1000 performs photographic processing, the imaging unit 50 stores photographic setting data that indicates a variety of information items in the photographic processing in the data storage unit 60 in association with the normal photographic coded data or the high-speed photographic coded data.

Hereinafter, the normal photographic coded data, the high-speed photographic coded data, and the photographic setting data stored in the data storage unit 60 are referred to as normal photographic coded data NSD, high-speed photographic coded data HSD, and photographic setting data SHD, respectively.

The photographic setting data SHD indicates information items such as image size information, reproduction information, temporal information, frame information, photographic frame rate information. The image size information indicates image size of a video obtained by photography (for example, width: 1280 dots, height: 720 dots). Hereinafter, an image size of K-dot wide and L-dot high is expressed as "K×L".

The reproduction information indicates (i) information (a file name, for example) to specify each of the normal photographic coded data and the high-speed photographic coded data, (ii) an order of reproduction of the normal photographic coded data and the high-speed photographic coded data, for example. The temporal information indicates reproduction times of a video for which the normal photographic coded data and the high-speed photographic coded data are each reproduced. The frame information indicates the number of frames in a video in the case where the normal photographic coded data and the high-speed photographic coded data are each reproduced.

The photographic frame rate information indicates a frame rate at which photographic processing is performed in normal photographic mode or high-speed photographic mode (hereinafter referred to as photographic frame rate). For example, the photographic frame rate information is 1/60 when one frame is captured every 1/60 second in photographic processing.

Figure 3:
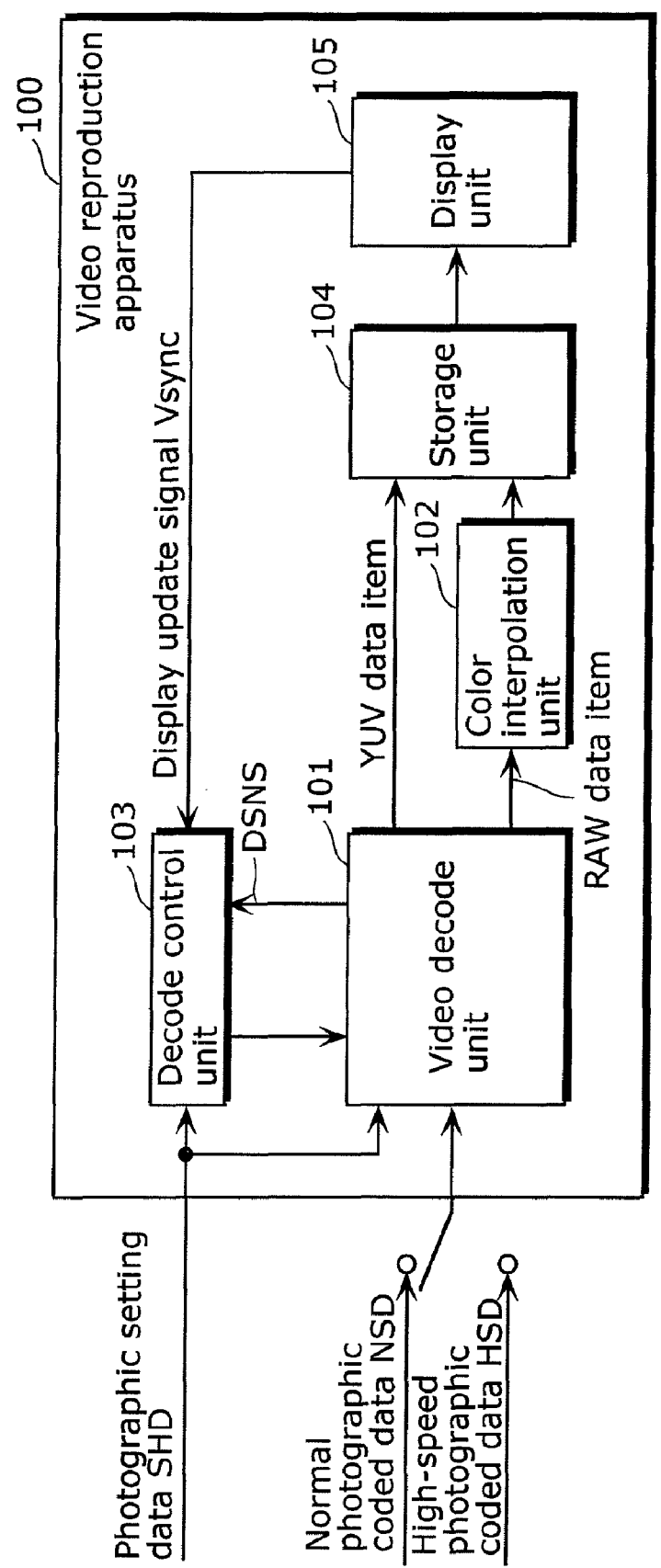
FIG. 3 is a block diagram showing a configuration of a video reproduction apparatus according to the first embodiment.

FIG. 3 is a block diagram showing a configuration of the video reproduction apparatus 100 according to the first embodiment. The video reproduction apparatus 100 is equivalent to an image reproduction unit of the photography apparatus 1000. The present invention also includes an integrated semiconductor circuit in which units in the video reproduction apparatus 100 are circuitized and integrated.

The video reproduction apparatus 100 shown in FIG. 3 includes a video decode unit 101, a color interpolation unit 102, a decode control unit 103, a storage unit 104, and a display unit 105. The video decode unit 101, the color interpolation unit 102, the decode control unit 103, and the storage unit 104 may be each formed as an electric circuit. In this case, the video reproduction apparatus 100 which includes the video decode unit 101, the color interpolation unit 102, the decode control unit 103, and the storage unit 104 is an integrated semiconductor circuit.

The storage unit 104 is a memory to in which data is stored.

In order to decode the normal photographic coded data NSD stored in the data storage unit 60, the video decode unit 101 reads out the normal photographic coded data NSD from the data storage unit 60 according to the reproduction information indicated by the photographic setting data SHD stored in the data storage unit 60. Then, the video decode unit 101 successively decodes the plurality of normal coded data items included in the normal photographic coded data NSD and stores a plurality of YUV data items resulting from the decoding in the storage unit 104 in an order of the decoding.

In order to decode the high-speed photographic coded data HSD stored in the data storage unit 60, the video decode unit 101 reads out the high-speed photographic coded data HSD from the data storage unit 60 according to the reproduction information indicated by the photographic setting data SHD stored in the data storage unit 60. Then, the video decode unit 101 successively decodes the plurality of high-speed coded data items included in the high-speed photographic coded data HSD and transmits a plurality of RAW data items resulting from the decoding to the color interpolation unit 102 in the order of the decoding.

The video decode unit 101 transmits a start-of-decode notification signal DSNS to the decode control unit 103 with each start of decoding the respective coded data items (the normal coded data items or the high-speed coded data items).

The color interpolation unit 102 converts, with each reception of the respective RAW data items from the video decode unit 101, the respective RAW data items to the respective YUV data items by performing color interpolation on the received RAW data items, and then stores the YUV data items in the storage unit 104.

The display unit 105 displays images which are individually based on one of the plurality of YUV data items stored in the storage unit 104 in an order of the storing of the YUV data items corresponding to the images in the storage unit 104. For example, the display unit 105 may be a liquid-crystal-panel display. The display unit 105 is not limited to the liquid-crystal-panel display. The display unit 105 may be a plasma-display-panel (PDP) display, for example. The display unit 105 transmits a display update signal Vsync to the decode control unit 103. This is described in detail later.

The video reproduction apparatus 100 may not include the storage unit 104 or the display unit 105. In this case, the storage unit 104 or the display unit 105 is provided outside of the video reproduction apparatus 100. In this case, the video reproduction apparatus 100 is connected to the storage unit 104 provided outside of it. In this case, the video reproduction apparatus 100 performs processing for causing the display unit 105, which is provided outside of the video reproduction apparatus 100, to display images which are individually based on one of the plurality of YUV data items stored in the storage unit 104 in an order of the storing of the YUV data items corresponding to the images in the storage unit 104.

Figure 4:
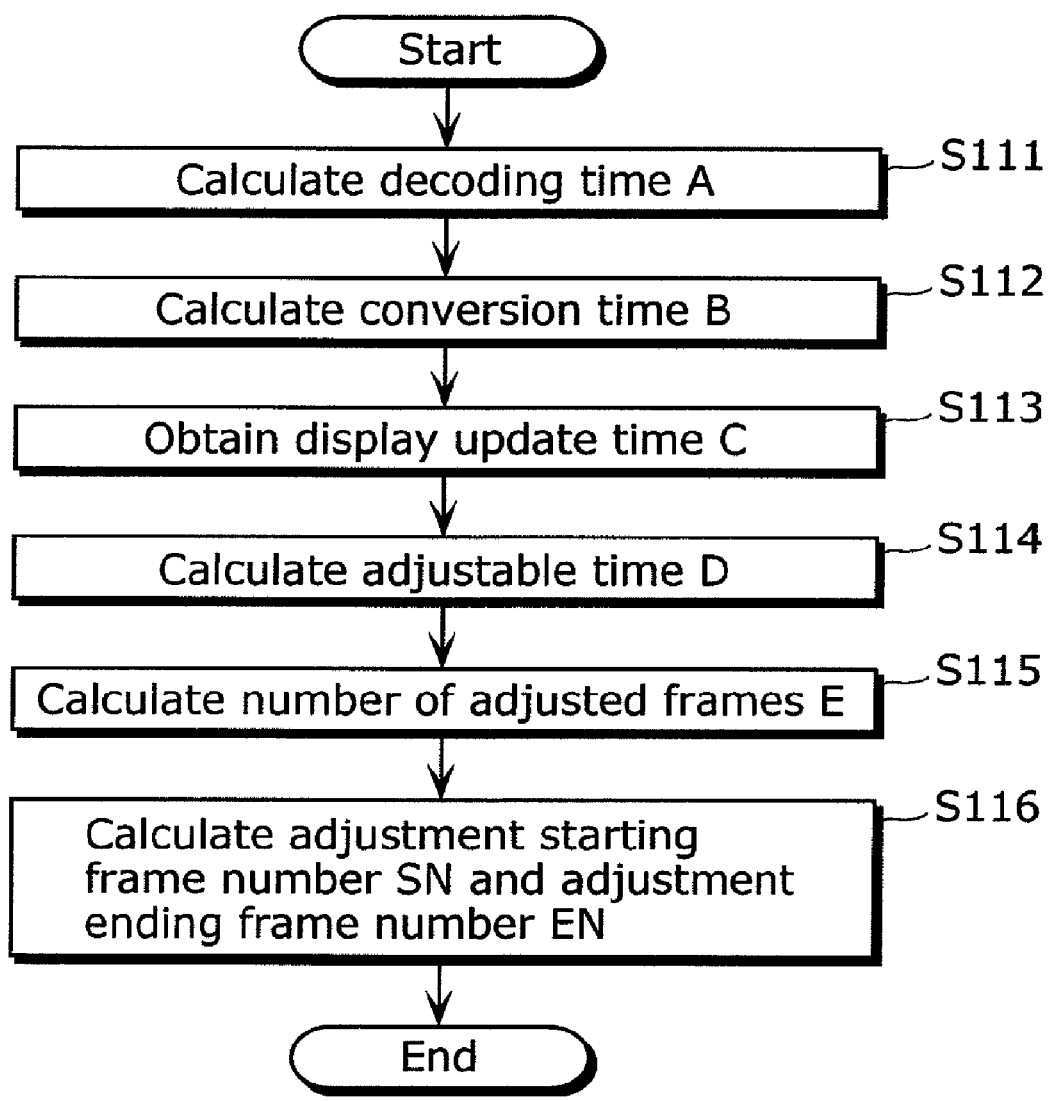
FIG. 4 is a flowchart of processing performed by a decode control unit.

FIG. 4 is a flowchart of processing performed by the decode control unit 103.

The decode control unit 103 calculates a decode time A (S111). The decode time A is a period of time necessary for the video decode unit 101 to decode a normal coded data item or a high-speed coded data item.

The decode control unit 103 also calculates a conversion time B (S112). The conversion time B is a period of time necessary for the color interpolation unit 102 to convert a RAW data item received from the video decode unit 101 to a YUV data item.

The decode time A and the conversion time B are proportional to the size of an image corresponding to a data item to be processed (such as a normal coded data item, a high-speed coded data item, and a RAW data item). Accordingly, in order to calculate the decode time A and the conversion time B, the decode control unit 103 stores (or is provided with as settings of) a referential image size, a referential decode time, and a referential conversion time in advance.

For example, it is assumed that the decode control unit 103 stores a referential image size of the VGA size (640×480), a referential decode time of 10 msec, and a referential conversion time of 5 msec in advance.

The decode control unit 103 calculates the decode time A and the conversion time B with reference to the image size indicated by the image size information indicated by the photographic setting data SHD stored in the data storage unit 60. Here, it is assumed that the image size indicated by the image size information is the high-definition (HD) size (1280×720).

In this case, the image size (1280×720) indicated by the image size information indicated by the photographic setting data SHD has three times more pixels than the referential image size (640×480). Thus, the decode time A calculated by the decode control unit 103 is 30 msec, which is three times longer than the referential decode time 10 msec. The conversion time B calculated by the decode control unit 103 is 15 msec, which is three times of the referential conversion time, 5 msec.

The decode control unit 103 also obtains display update time C (S113). The display update time C is a period of time necessary for the display unit 105 to update an image to display. The display update time C is a predetermined period of time. Here, it is assumed that the display unit 105 updates images of 60 frames per second. In this case, the display update time C is a 1/60 second. It is assumed that the display update information which indicates the display update time C has been already stored in the data storage unit 60. In this case, the decode control unit 103 obtains the display update time C by referring to the display update information stored in the data storage unit 60.

The decode control unit 103 also calculates an adjustable time D (S114). The adjustable time D is a period of time by which the timing of decoding of each of the coded data items (normal coded items or high-speed coded data items) stored in the data storage unit 60 is brought forward when the video is reproduced.

The adjustable time D is calculated using an expression of the display update time C—the decode time A. Practically, the adjustable time D is calculated using an expression of the display update time C—the decode time A—overhead time. The overhead time is a period of time necessary for the decode control unit 103 to provide the video decode unit 101 with a setting to bring forward the timing of decoding of a specific coded data item. It is assumed that the overhead time is a predetermined period of time (0.7 msec, for example).

The decode control unit 103 also calculates the number of adjusted frames E (S115). The number of adjusted frames E is the number of frames (coded data items) with timings of decoding brought forward. The number of adjusted frames E is calculated using an expression of the conversion time B/the adjustable time D.

The decode control unit 103 also calculates an adjustment starting frame number SN and an adjustment ending frame number EN (S116). The adjustment starting frame number SN is a frame number of the first frame (coded data item) with a timing of decoding brought forward. The adjustment ending frame number EN is a frame number of the last frame (coded data item) with a timing of decoding brought forward.

The adjustment starting frame number SN is calculated using an expression of the number of frames of normal photography NFN—the number of adjusted frames E+1. The number of frames of normal photography NFN is the number of frames of a video in the case where normal photographic coded data (hereinafter referred to as a normal photographic video) is reproduced. In the first embodiment, the number of frames of normal photography NFN is equal to the adjustment ending frame number EN. In other words, calculating the number of frames of normal photography NFN provides the adjustment ending frame number EN.

The number of frames of normal photography NFN is calculated using an expression of the reproduction time of normal photography/the photographic frame rate. In this expression, the reproduction time of normal photography is reproduction time of a video in the case where the normal photographic coded data indicated by the temporal information indicated by the photographic setting data SHD is reproduced. In this expression, the photographic frame rate is the photographic frame rate indicated by the photographic setting data SHD.

Here, it is assumed that the decode time A and the decode time B are calculated to be 15 msec and 5 msec, respectively. It is also assumed that the display update time C is 16.7 msec (1/60 second). It is also assumed that the overhead time is 0.7 msec. In this case, the adjustable time D is calculated using the expression of the display update time C—the decode time A—the overhead time, that is, 16.7−15−0.7, which equals 1 (msec).

In this case, the number of adjusted frames E is calculated using the expression of the conversion time B/the adjustable time D, which provides a result of 5.

Here, it is assumed that reproduction time of normal photography is 5 seconds, for example. It is also assumed that photographic frame rate is 1/60. In this case, the number of frames of normal photography NFN is calculated using the expression of the reproduction time of normal photography/the photographic frame rate, which provides a result of 300. Thus, the adjustment ending frame number EN is 300.

In this case, the adjustment starting frame number SN is calculated using the expression of the number of frames of normal photography NFN—the number of adjusted frames E+1, which provides a result of 296. Thus, the frame number of the first frame (coded data item), or the adjustment starting frame number SN is 296.

Figure 5:
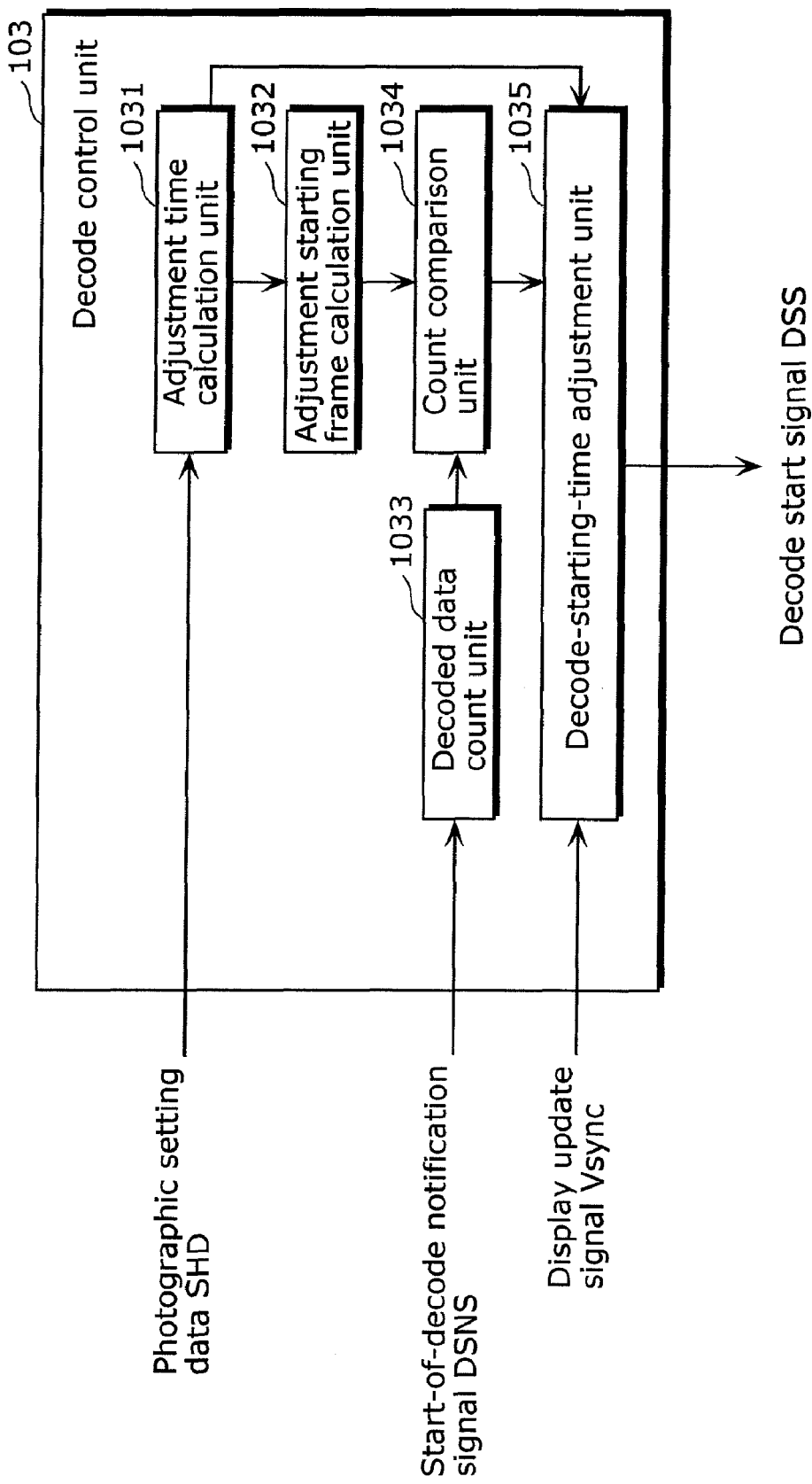
FIG. 5 is a block diagram showing an internal configuration of the decode control unit

FIG. 5 is a block diagram showing an internal configuration of the decode control unit 103.

The decode control unit 103 includes an adjustment time calculation unit 1031, an adjustment starting frame calculation unit 1032, a decoded data count unit 1033, a count comparison unit 1034, and a decode-starting-time adjustment unit 1035.

The adjustment time calculation unit 1031 reads out the photographic setting data SHD stored in the data storage unit 60 from the data storage unit 60 and calculates the decode time A and the conversion time B by the processing (S111, S112) described above. The adjustment time calculation unit 1031 also obtains the display update time C by the processing (S113) described above. The adjustment time calculation unit 1031 also calculates the adjustable time D by the processing (S114) described above. The adjustment time calculation unit 1031 notifies the adjustment starting frame calculation unit 1032 and the decode-starting-time adjustment unit 1035 of the calculated adjustable time D.

Using the adjustable time D which the adjustment starting frame calculation unit 1032 has been notified of, the adjustment starting frame calculation unit 1032 calculates the number of adjusted frames E, the adjustment starting frame number SN, and the adjustment ending frame number EN by the processing (S115, S116) described above. The adjustment starting frame calculation unit 1032 notifies the count comparison unit 1034 of the calculated adjustment starting frame number SN, and adjustment ending frame number EN.

The decoded data count unit 1033 receives, from the video decode unit 101, the start-of-decode notification signal DSNS with each start of decoding of the respective coded data items (the normal coded data items or the high-speed coded data items) by the video decode unit 101. The decoded data count unit 1033 includes a counter DK to count decoded data items. The counter DK has an initial value of zero.

When the value of the counter DK is zero, the decoded data count unit 1033 notifies the count comparison unit 1034 of the value of the counter DK. The decoded data count unit 1033 then increments the value of the counter DK by one with every reception of the start-of-decode notification signal DSNS. With every change in the value of the counter DK, the decoded data count unit 1033 notifies the count comparison unit 1034 of the value of the counter DK after the change.

With every notification of the value of the counter DK from the decoded data count unit 1033, the count comparison unit 1034 compares the value of the counter DK with the adjustment starting frame number SN and the adjustment ending frame number EN which the count comparison unit 1034 has been notified of by the adjustment starting frame calculation unit 1032. The count comparison unit 1034 transmits an instruction for start of adjustment to the decode-starting-time adjustment unit 1035 when the value of the counter DK becomes smaller than the adjustment starting frame number SN by one, for example, 295 and 296, respectively.

The instruction for start of adjustment is an instruction to bring forward the time to start decoding each of the adjustment starting frame number SNth to the adjustment ending frame number ENth coded data items by the adjustable time D.

Hereinafter, a coded data item corresponding to the Hth frame, where H is a natural number, is simply referred to as the Hth coded data item. Hereinafter, a YUV data item obtained from the Hth coded data item is simply referred to as the Hth YUV data item.

When not receiving the instruction for start of adjustment from the count comparison unit 1034, the decode-starting-time adjustment unit 1035 transmits a decode start signal DSS to the video decode unit 101 with every elapse of the display update time C. The decode start signal DSS is a signal that causes the video decode unit 101 to perform decoding of the coded data items. The display update time C is a period of time between two rising points adjacent to each other in the display update signal Vsync which the decode-starting-time adjustment unit 1035 receives from the display unit 105. The rising points are the points where the level of the signal changes from the level L to the level H.

With every reception of the decode start signal DSS, the video decode unit 101 starts decoding of the Hth coded data item while transmitting the start-of-decode notification signal DSNS to the decode control unit 103. When finishing the decoding of the Hth coded data item, the video decode unit 101 increments the value of H by one. Specifically, the video decode unit 101 performs the decoding on the Hth, (H+1)th, (H+2)th . . . coded data items successively with every reception of the decode start signal DSS.

When receiving the instruction for start of adjustment from the count comparison unit 1034, the decode-starting-time adjustment unit 1035 performs adjustment processing A described below.

In the adjustment processing A, the decode-starting-time adjustment unit 1035 transmits a decode start signal DSS to the video decode unit 101 when a period of time calculated using an expression of the display update time C—the adjustable time D has elapsed since the transmission of the last decode start signal DSS to the video decode unit 101. This is hereinafter referred to as transmission adjustment. The adjustment processing A ends when the transmission adjustment is performed, for example, five times, which is calculated using an expression of the adjustment ending frame number EN—the adjustment starting frame number SN+1.

In other words, with every transmission adjustment, the timing with which the decode-starting-time adjustment unit 1035 transmits a decode start signal DSS to the video decode unit 101 is brought forward by the adjustable time D. For example, it is assumed that the transmission adjustment is performed three times. In this case, a decode start signal DSS is transmitted to the video decode unit 101 with a timing which is three times of the adjustable time D ahead of a predetermined timing in the third transmission adjustment is performed.

In this case, on receiving the decode start signal DSS, the video decode unit 101 starts coding processing of the adjustment starting frame number SNth (for example, 296th) coded data item with a timing which is the adjustable time D ahead of a predetermined timing.

Figure 6:
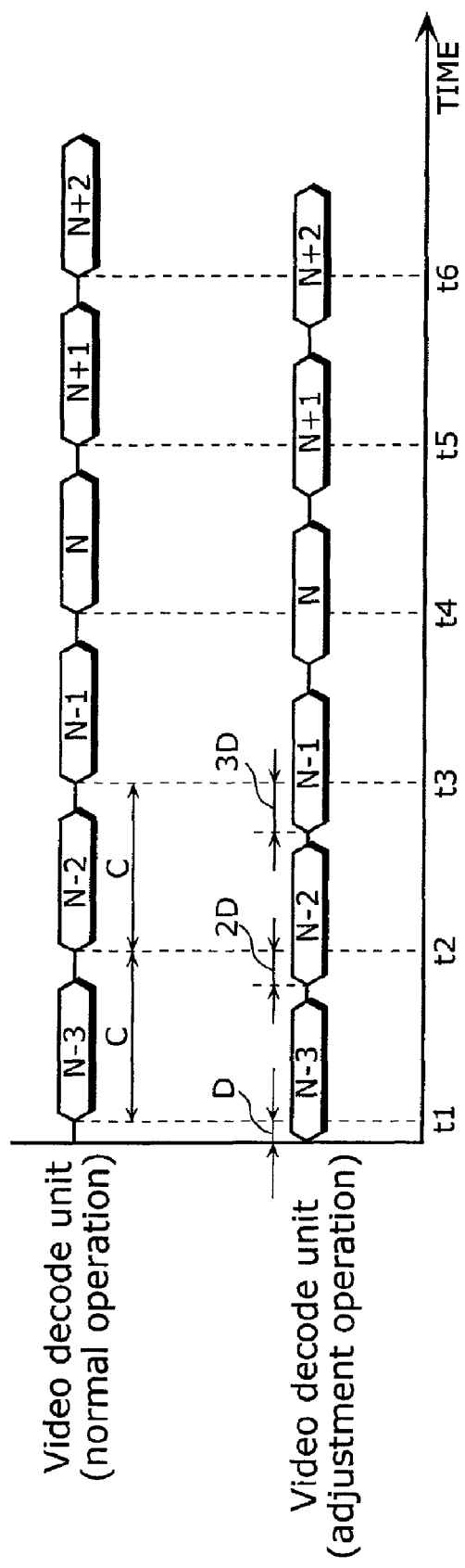
FIG. 6 illustrates timings with which decoding of coded items is started.

FIG. 6 illustrates timings with which decoding of the coded items is started. Each hexagon in FIG. 6 indicates a data item (the coded data item).

In FIG. 6, the (N−3)th to (N+2)th coded data items provided in the row of "Video decode unit (normal operation)" indicate how the video decode unit 101 performs the decoding in the case where the decode-starting-time adjustment unit 1035 has not received the instruction for start of adjustment. In this case, the decode-starting-time adjustment unit 1035 transmits the decode start signal DSS to the video decode unit 101 with every elapse of the display update time C.

In this case, the video decode unit 101 starts the decoding of the respective coded data items ((N−3)th, (N−2)th . . . coded data items) successively with predetermined timings (times t1, t2, t3 . . . ). In other words, the video decode unit 101 performs the decoding process on the coded data items successively with every elapse of display update time C.

For example, the video decode unit 101 starts performing the decoding process on the (N−3)th, the (N−2)th, and the (N−1)th coded data items at times t1, t2, and t3, respectively.

In FIG. 6, the (N−3)th to (N+2)th coded data items provided in the row of "Video decode unit (adjustment operation)" indicate how the video decode unit 101 performs the decoding in the case where the decode-starting-time adjustment unit 1035 has received the instruction for start of adjustment.

FIG. 6 shows how the coded data items are decoded in the case where the number of adjusted frames E is three. In this case, it is assumed as an example that the adjustment starting frame number SNth coded data item is the (N−3)th coded data item. It is also assumed as an example that the adjustment ending frame number ENth coded data item is the (N−1)th coded data item.

In this case, the decode-starting-time adjustment unit 1035 performs the transmission adjustment three times. As described above, with every transmission adjustment, the timing with which the decode-starting-time adjustment unit 1035 transmits the decode start signal DSS to the video decode unit 101 is brought forward by the adjustable time D.

Accordingly, the decode-starting-time adjustment unit 1035 transmits the first decode start signal DSS to the video decode unit 101 with a timing which is the adjustable time D ahead of the predetermined time (time t1). The decode-starting-time adjustment unit 1035 also transmits the third decode start signal DSS to the video decode unit 101 with a timing which is three times of the adjustable time D ahead of the predetermined time (time t3).

In this case, with every reception of the decode start signal DSS, the video decode unit 101 starts the decoding of a corresponding coded data item with a timing ahead of a predetermined timing. For example, when receiving the first decode start signal DSS, the video decode unit 101 starts the decoding of the (N−3)th, in other words, the adjustment starting frame number SNth coded data item with a timing which is the adjustable time D ahead of the predetermined time (time t1).

For example, when receiving the third decode start signal DSS, the video decode unit 101 starts the decoding of the (N−1)th, in other words, the adjustment ending frame number ENth coded data item with a timing which is three times of the adjustable time D ahead of the predetermined time (time t3).

The following describes processing in the photography apparatus 1000 for continuous reproducing of the temporally continuous normal photographic coded data NSD and high-speed photographic coded data HSD which are obtained in the case where photographic processing in normal photographic mode is switched to photographic processing in high-speed photographic mode.

First described is conventional processing, which does not included the adjustment processing A, in the case where the temporally continuous normal photographic coded data NSD and high-speed photographic coded data HSD are reproduced continuously.

FIG. 7A is a timing chart showing the case where the normal photographic coded data NSD and the high-speed photographic coded data HSD are reproduced continuously without the adjustment processing A. In FIG. 7A, hexagons each indicate a data item (such as a coded data item, a RAW data item, and a YUV data item).

In FIG. 7A, the hexagons in the row of "Video decode unit" each indicate a coded data item. The hexagons in the row of "Storage unit" each indicate a YUV data item.

In the first embodiment, it is assumed as an example that first to (N−1)th coded data items are obtained by photographic processing performed by the photography apparatus 1000 in normal photographic mode. It is also assumed as an example that the Nth to (N+S)th coded data items, where S is an integer not less than two, are obtained by photographic processing performed by the photography apparatus 1000 in high-speed photographic mode.

In this case, each of the (N−3)th to (N−1)th coded data items in FIG. 7A is a normal coded data item included in the normal photographic coded data NSD. Each of the Nth to (N+2)th coded data items in FIG. 7A is a high-speed coded data item included in the high-speed photographic coded data HSD.

A period A shown in FIG. 7A is the decode time A described above. The decode time of each of the (N−3)th to (N+2)th coded data items in the row of "Video decode unit" shown in FIG. 7A is the decode time A.

FIG. 7A shows as an example that the video decode unit 101 starts decoding of the (N−3)th, (N−2)th, and (N−1)th coded data items (normal coded data items) at the predetermined times of the times t1, t2, and t3, respectively. FIG. 7A also shows as an example that the video decode unit 101 starts decoding of the Nth, (N+1)th, and (N+2)th coded data items (high-speed coded data items) at the predetermined times of the times t4, t5, and t6, respectively.

While decoding the (N−3)th, (N−2)th and (N−1)th coded data items (normal coded data items), the video decode unit 101 stores data items (YUV data items) obtained by the decoding in the storage unit 104. Accordingly, upon finishing decoding of the normal coded data items, the video decode unit 101 finishes storing the data items (YUV data items) obtained by the decoding in the storage unit 104.

Decoding of each of the coded data items by the video decode unit 101 is finished when the decode time A has elapsed since each of the times (time t1, t2 . . . ).

In the example shown in FIG. 7A, the color interpolation unit 102 starts color interpolation at a point of time in the decoding of the high-speed coded data items. Specifically, the color interpolation unit 102 starts color interpolation of the decoded data items (RAW data items) when the decoding of the high-speed coded data items has progressed to a predetermined extent or more.

It is also possible that the color interpolation unit 102 starts the color interpolation of the decoded data items (RAW data items) when the decoding of the high-speed coded data items is finished.

FIG. 7A shows as an example that the color interpolation unit 102 starts color interpolation of decoded data when a period T1 has elapsed since when decoding of the Nth coded data item (a high-speed coded data item) is started (time t4). In FIG. 7A, a period B is the conversion time B described above.

While performing color interpolation on the data items (RAW data items) which is to undergo color interpolation, the color interpolation unit 102 stores data items (YUV data items) obtained by performing the color interpolation in the storage unit 104. Accordingly, upon finishing the color interpolation of the RAW data items, the color interpolation unit 102 finishes storing the data items (YUV data items) obtained by the decoding in the storage unit 104.

The display unit 105 internally processes a display update signal Vsync shown in FIG. 7A. The display unit 105 displays an image which is based on the YUV data items stored in the storage unit 104 at a time of rising points described above (such as time t11) in the display update signal Vsync.

In the example shown in FIG. 7A, the video decode unit 101 is yet to finish storing the (N−3)th YUV data item in the storage unit 104 at the time t11. The display unit 105 thus displays an image which is based on the (N−4)th YUV data item stored in the storage unit 104.

In the case where the adjustment process A is not performed, the color interpolation unit 102 is yet to finish storing the Nth YUV data item in the storage unit 104 at the time t51. The display unit 105 thus displays an image which is based on the (N−1)th YUV data item stored in the storage unit 104.

In other words, in the case where the adjustment process A is not performed, the display unit 105 displays the image (frame) which is based on the (N−1)th YUV data item twice. Accordingly, the video which the display unit 105 displays will be unnatural. Consequently, a user watching the video shown by the display unit 105 will find the video unnatural.

The following describes processing by the video reproduction apparatus 100 (hereinafter referred to as video reproduction processing), which includes the adjustment processing A, in the photography apparatus 1000 for continuous reproducing of the temporally continuous normal photographic coded data NSD and high-speed photographic coded data HSD which are obtained in the case where photographic processing in normal photographic mode is switched to photographic processing in high-speed photographic mode. In this case, the normal photographic coded data NSD and the high-speed photographic coded data HSD are stored in the data storage unit 60.

Here, it is assumed that the normal photographic coded data NSD includes 300 coded data items (normal coded data items). Here, it is assumed that the high-speed photographic coded data HSD includes 3000 coded data items (high-speed coded data items). In this case, it is assumed that the data storage unit 60 stores 3300 coded data items. The 3300 coded data items stored in the data storage unit 60 are ordered in a sequence. In this case, each of the first to 300th coded data items is a normal coded data item. Each of the 301st to 3300th coded data items is a high-speed coded data item.

FIG. 7B is a timing chart showing the case where the normal photographic coded data NSD and the high-speed photographic coded data HSD are reproduced continuously when the adjustment processing A is performed. Hexagons shown in FIG. 7B indicates the same as the hexagons shown in FIG. 7A, thus a detailed description thereof is not repeated here.

Figure 8:
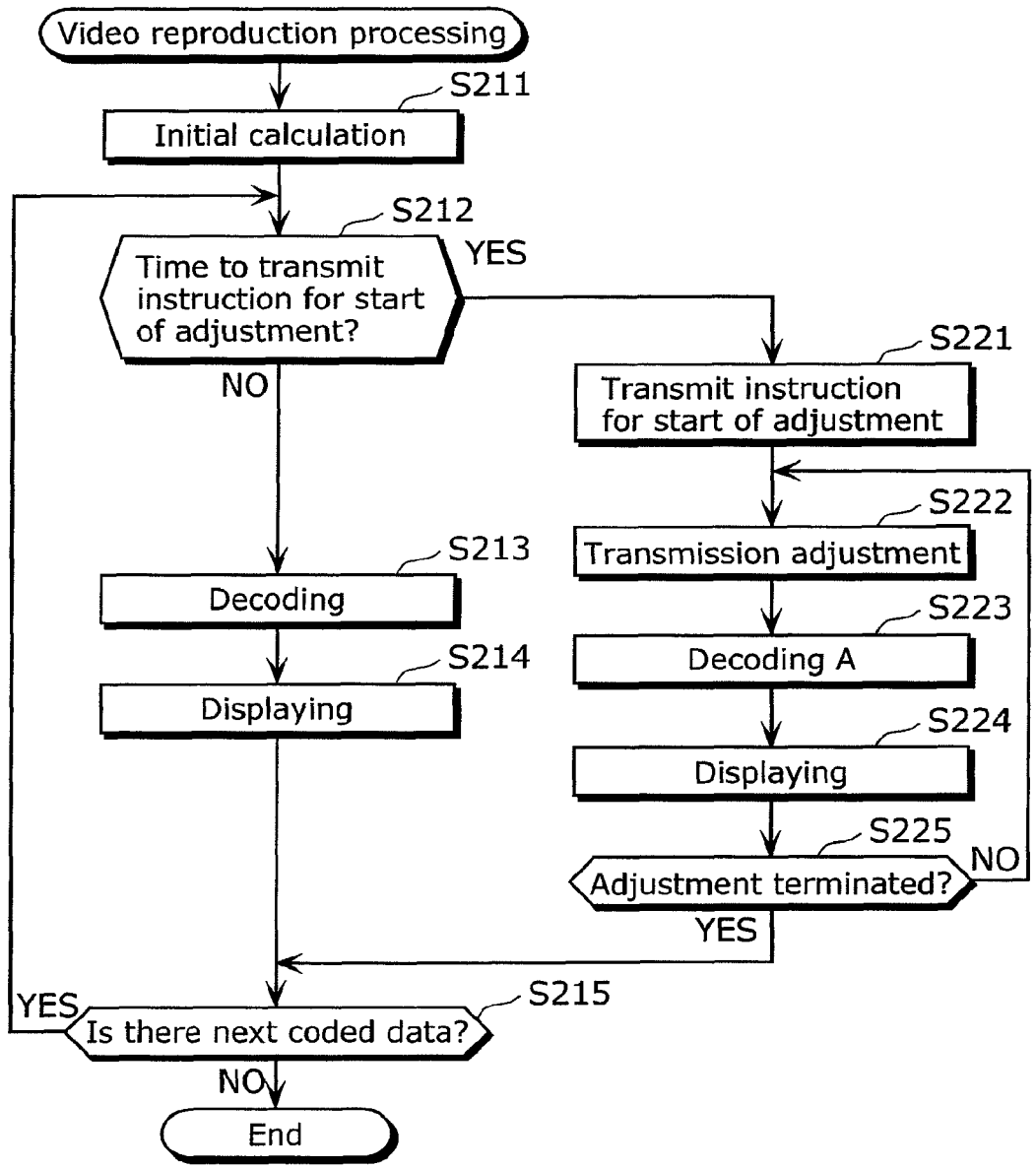
FIG. 8 is a flowchart of video reproduction processing.

FIG. 8 is a flowchart of the video reproduction processing. In FIG. 8, an initial calculation is performed in Step S211. The initial calculation is the processing of Steps S111 to S116 in FIG. 4, thus a detailed description thereof is not repeated here.

It is assumed as an example that the number of adjusted frames E, the adjustment starting frame number SN, and the adjustment ending frame number EN, which are calculated through the initial calculation, are 3, N−3, and N−1, respectively.

As described above, the adjustment starting frame calculation unit 1032 notifies the count comparison unit 1034 of the calculated adjustment starting frame number SN (N−3) and the calculated adjustment ending frame number EN (N−1). As described above, the decoded data count unit 1033 notifies the count comparison unit 1034 of the value of the counter DK.

In Step S212, the count comparison unit 1034 determines whether or not the present time is the time to transmit the instruction for start of adjustment. The time to transmit the instruction for start of adjustment is when the newest value of the counter DK becomes smaller than the adjustment starting frame number SN by one, for example, 297 and 298, respectively.

If YES in Step S212, the processing proceeds to Step S221 described later. If NO in Step S212, the processing proceeds to Step S213. Here, it is assumed that the present time is not the time to transmit the instruction for start of adjustment and the processing proceeds to Step S213.

In Step S213, decoding is performed. Firstly in the decoding, the decode-starting-time adjustment unit 1035 transmits the decode start signal DSS to the video decode unit 101. When receiving the decode start signal DSS, the video decode unit 101 reads out the Qth coded data item from the data storage 60 to obtain the Qth coded data item, where Q is a natural number. The initial value of Q is one.

In the case where the video decode unit 101 obtains a YUV data item by decoding the Qth coded data item, the video decode unit 101 stores the YUV data item in the storage unit 104 while decoding the Qth coded data item.

In the case where the video decode unit 101 obtains a RAW data item by the decoding, the video decode unit 101 transmits the obtained RAW data item to the color interpolation unit 102. The color interpolation unit 102 performs color interpolation on the received RAW data item. In the example shown in FIG. 7B, as in the case of FIG. 7A, the color interpolation unit 102 starts color interpolation of the decoded data items (RAW data items) at the time when the decoding of the high-speed coded data items has progressed to a predetermined extent or more.

While performing color interpolation on the data items (RAW data items) which is to undergo color interpolation, the color interpolation unit 102 stores data items (YUV data items) obtained by performing the color interpolation in the storage unit 104. Accordingly, upon finishing the color interpolation of the RAW data items, the color interpolation unit 102 finishes storing the data items (YUV data items) obtained by performing the color interpolation in the storage unit 104.

The video decode unit 101 also transmits the start-of-decode notification signal DSNS to the decode control unit 103 when starting the decoding of the Qth coded data item. The video decode unit 101 then increments the value of Q by one.

As described above, the decoded data count unit 1033 in the decode control unit 103 increments the value of the counter DK by one with every reception of the start-of-decode notification signal DSNS. With every change in the value of the counter DK, the decoded data count unit 1033 notifies the count comparison unit 1034 of the value of the counter DK.

In Step S214, displaying is performed. As described above, in the displaying, the display unit 105 displays images which are based on the YUV data items stored in the storage unit 104 at times of rising points in the display update signal Vsync.

In Step S215, the decode control unit 103 determines whether or not there is a next coded data item. Specifically, the decode control unit 103 determines, with reference to information such as reproduction information and frame information indicated by the photographic setting data SHD stored in the data storage unit 60, whether or not there is a coded data item to be decoded next. If YES in Step S215, Step S212 is performed again in the processing. If NO in Step S215, the video reproduction processing ends. Here, it is assumed that there is a next coded data item and Step S212 is performed again.

The newest value of the counter DK becomes smaller than the adjustment starting frame number SN by one after Steps S213, S214, and S215 in the processing are performed a plurality of times. In this case, the processing proceeds to Step S221 with YES in Step S212.

In Step S221, the count comparison unit 1034 transmits the instruction for start of adjustment to the decode-starting-time adjustment unit 1035. As described above, the instruction for start of adjustment is an instruction to bring forward the time to start decoding each of the adjustment starting frame number SNth to adjustment ending frame number ENth coded data items by the adjustable time D.

The decode-starting-time adjustment unit 1035 performs the adjustment processing A when receiving the instruction for start of adjustment.

In Step S222, the transmission adjustment is performed. As described above, the transmission adjustment is processing in which the decode-starting-time adjustment unit 1035 transmits the last decode start signal DSS to the video decode unit 101, and then transmits a current decode start signal DSS to the video decode unit 101 after a period of time calculated using an expression of the display update time C—the adjustable time D has elapsed. With every transmission adjustment, the timing with which the decode-starting-time adjustment unit 1035 transmits the decode start signal DSS to the video decode unit 101 is brought forward by the adjustable time D.

When receiving the decode start signal DSS, the video decode unit 101 performs the decoding A described below.

In Step S223, the decoding A is performed. In the decoding A, when receiving the decode start signal DSS, the video decode unit 101 reads out the Qth coded data item from the data storage 60 to obtain the Qth coded data item.

The video decode unit 101 then stores the data items obtained by the decoding (YUV data items) in the storage unit 104 while decoding the Qth coded data item.

The video decode unit 101 also transmits the start-of-decode notification signal DSNS to the decode control unit 103 when starting the decoding of the Qth coded data item. The video decode unit 101 then increments the value of Q by one.

In the case of the first decoding A, the Qth coded data item to be obtained is the adjustment starting frame number SNth, which is (N−3)th, coded data item. In this case, the video decode unit 101 starts decoding of the (N−3)th coded data item with a point of time which is the adjustable time D ahead of the predetermined time (time t1), as shown in FIG. 7B. The processing on each data items shown in FIG. 7B is the same as the processing shown in FIG. 7A, thus a detailed description thereof is not repeated here.

Displaying in Step S224 is performed as in Step S214, thus a detailed description thereof is not repeated here.

In Step S225, whether or not adjustment is terminated is determined. Specifically, whether or not the number of decode start signals DSS which has been transmitted by the decode-starting-time adjustment unit 1035 since the reception of the instruction for start of adjustment is the number (three, for example,) calculated using the expression of the adjustment ending frame number EN—the adjustment starting frame number SN+1. If YES in Step S225, Step S215 is performed again in the processing. If NO in Step S225, Step S222 is performed again in the processing.

Here, it is assumed that Step S222 is performed again with NO. It is also assumed that the processing is performed from the Steps S222 to S224 three times.

In this case, as shown in FIG. 7B, the video decode unit 101 starts decoding of the adjustment ending frame number ENth, which is (N−1)th, coded data item with a timing which is three times of the adjustable time D ahead of the predetermined time (time t4). In this case, Step S215 is performed again in the processing with YES in Step S225.

The video reproduction processing is performed as described above, and the video decode unit 101 starts decoding of each of the plurality of high-speed coded data items (the Nth, (N+1)th, (N+2)th high-speed coded data items) with a timing which is ahead of the predetermined times (times t4, t5, t6, and the like) by a time calculated using the expression of three times of the adjustable time D. In this case, color interpolation of the data items (RAW data items) obtained by decoding of the high-speed coded data items are started with a timing which is ahead of the predetermined time by a time calculated using the expression of 333 the adjustable time D.

The time calculated using the expression of 3× the adjustable time D is a period of time necessary for the display unit 105 to display images obtained from the normal coded data items and the high-speed coded data items seamlessly (hereinafter, referred to as a time necessary for display).

This makes it possible that the color interpolation unit 102 finishes storing the Nth YUV data item in the storage unit 104 by the time t51. The display unit 105 thus displays an image which is based on the Nth YUV data item stored in the storage unit 104. Accordingly, displaying an image based on the (N−1)th YUV data item twice as in FIG. 7A is avoided.

Thus, in reproduction of the temporally continuous normal photographic coded data NSD and high-speed photographic coded data HSD, the image based on the Nth YUV data item is displayed with temporal continuity.

In other words, this makes it possible to seamlessly reproduce the temporally continuous normal photographic coded data NSD and high-speed photographic coded data HSD with temporal continuity. This means that it is possible to seamlessly reproduce video based on coded data of two different types without losing temporal continuity. This prevents a user watching the video from feeling unpleasantness while the video being reproduced is based on the coded data of two different types.

The color interpolation unit 102 according to the first embodiment starts color interpolation of the decoded data items (RAW data items) at the time when decoding of the high-speed coded data items has progressed to a predetermined extent or more, as shown in FIG. 7B. However, the present invention is not limited to this. It is also possible that the color interpolation unit 102 starts the color interpolation of the decoded data items (RAW data items) when decoding of the high-speed coded data items is finished.

For example, in the case where the time calculated using the expression of 3× adjustable time D is equal to or longer than the conversion time B, the color interpolation unit 102 may start color interpolation of the decoded data items (RAW data items) obtained by the decoding when the decoding of the high-speed coded data items has finished.

In this case, the video decode unit 101 starts decoding of each of the high-speed coded data items with a timing which is the conversion time B ahead of the predetermined times. In this case, the conversion time B is a period of time necessary for the display unit 105 to seamlessly display images obtained from each of the normal coded data items and the high-speed coded data items. In this case, it is still possible to seamlessly reproduce the temporally continuous normal photographic coded data NSD and high-speed photographic coded data HSD with temporal continuity.

Variation of First Embodiment

In the first embodiment, only the timings of decoding of the normal coded data items are brought forward among the coded data items. Processing according to the present variation of the first embodiment (hereinafter referred to as video reproduction processing A) is described. According to the present variation, the beginning one of the high-speed coded data items is also among the coded data items for which the timing of decoding is brought forward.

Figure 9:
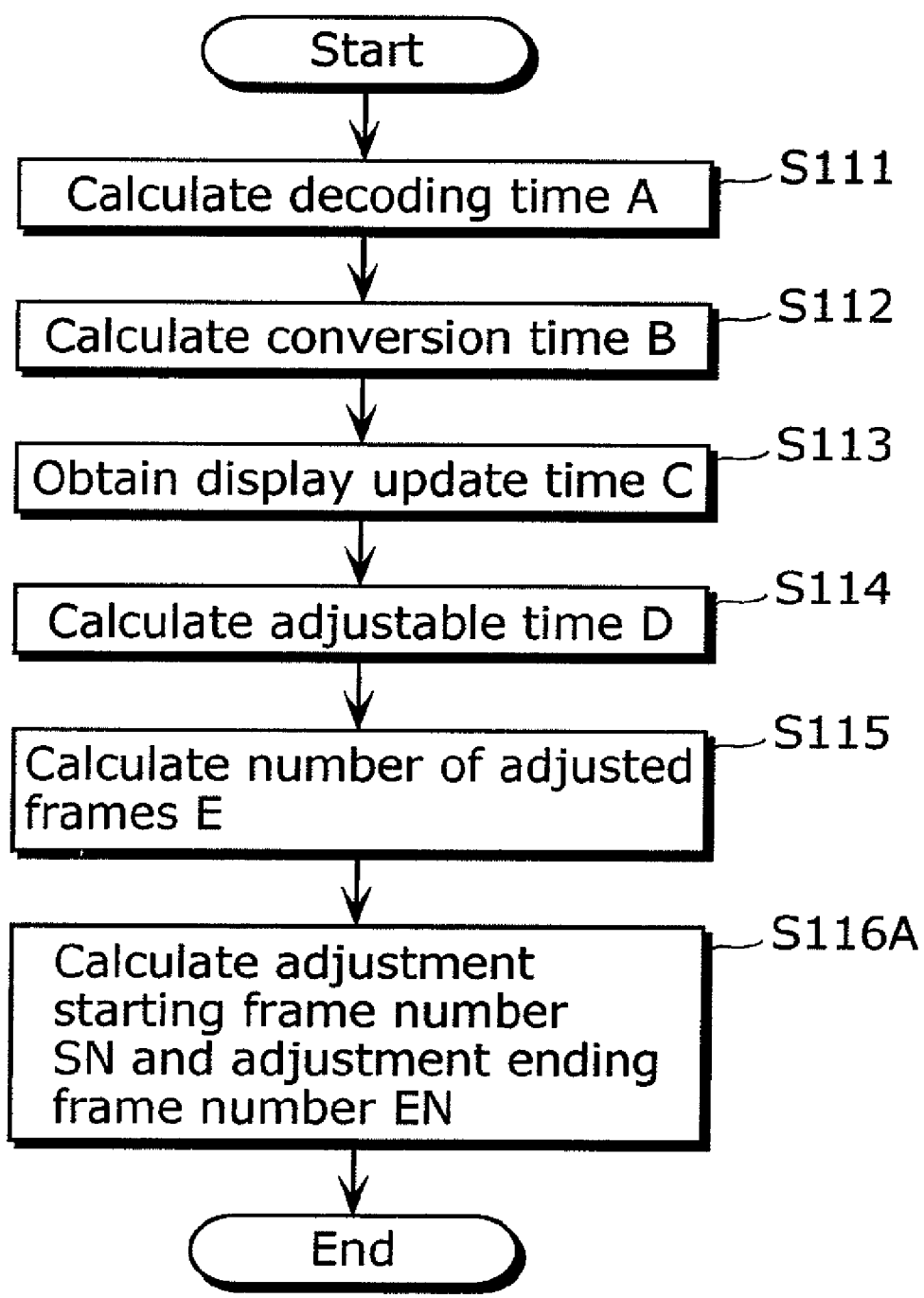
FIG. 9 is a flowchart of processing performed by the decode control unit according to a variation of the first embodiment.

FIG. 9 is a flowchart of processing performed by the decode control unit 103 according to the present variation of the first embodiment. In the steps in FIG. 9 with the same step number as in FIG. 4, the processing is performed in the same manner as described according to the first embodiment, thus a detailed description thereof is not repeated here.

In Step S116A, the decode control unit 103 calculates the adjustment starting frame number SN and the adjustment ending frame number EN.

The adjustment starting frame number SN is calculated using an expression of the number of frames of normal photography NFN—the number of adjusted frames E+2. The adjustment ending frame number EN is calculated using an expression of the number of frames of normal photography NFN+1. The number of frames of normal photography NFN is calculated, as in the processing in Step S116, using an expression of the reproduction time of normal photography/the photographic frame rate.

Figure 10:
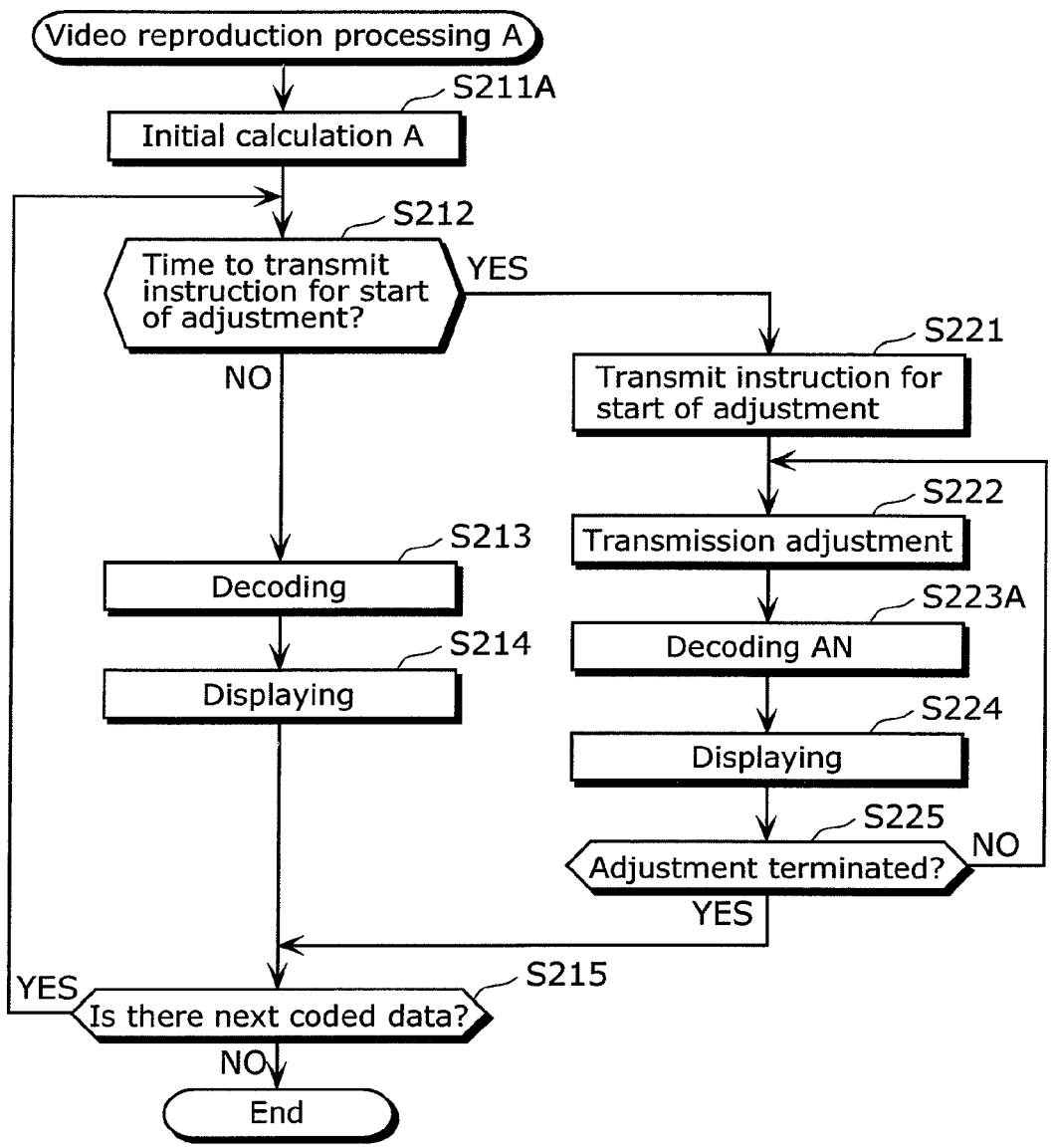
FIG. 10 is a flowchart of the video reproduction processing A.

FIG. 10 is a flowchart of the video reproduction processing A. In the steps in FIG. 10 with the same step number as in FIG. 8, the processing is performed in the same manner as described according to the first embodiment, thus a detailed description thereof is not repeated here.

In Step S211A, an initial calculation A is performed. The initial calculation A is the processing in Steps S111 to S116A in FIG. 9, thus a detailed description thereof is not repeated here.

It is assumed as an example that the number of adjusted frames E, the adjustment starting frame number SN, and the adjustment ending frame number EN, which are calculated through the initial calculation A, are 3, N−2, and N, respectively.

In Step S223A, decoding AN is performed. In the decoding AN, when receiving the decode start signal DSS, the video decode unit 101 reads out the Qth coded data item from the data storage 60 to obtain the Qth coded data item.

In the case where the video decode unit 101 obtains a YUV data item by decoding the Qth coded data item, the video decode unit 101 stores the YUV data item in the storage unit 104 while decoding the Qth coded data item.

In the case where the video decode unit 101 obtains a RAW data item by the decoding, the video decode unit 101 transmits the obtained RAW data item to the color interpolation unit 102. The color interpolation unit 102 performs color interpolation on the received RAW data item. While performing color interpolation on the data items (RAW data items) which is to undergo the color interpolation, the color interpolation unit 102 stores data items (YUV data items) obtained by the performing color interpolation in the storage unit 104.

The video decode unit 101 also transmits the start-of-decode notification signal DSNS to the decode control unit 103 when starting the decoding of the Qth coded data item. The video decode unit 101 then increments the value of Q by one.

In steps other than Steps S211A or S223A, the processing is the same performed in the same manner as described according to the first embodiment, thus a detailed description thereof is not repeated here.

Figure 11:
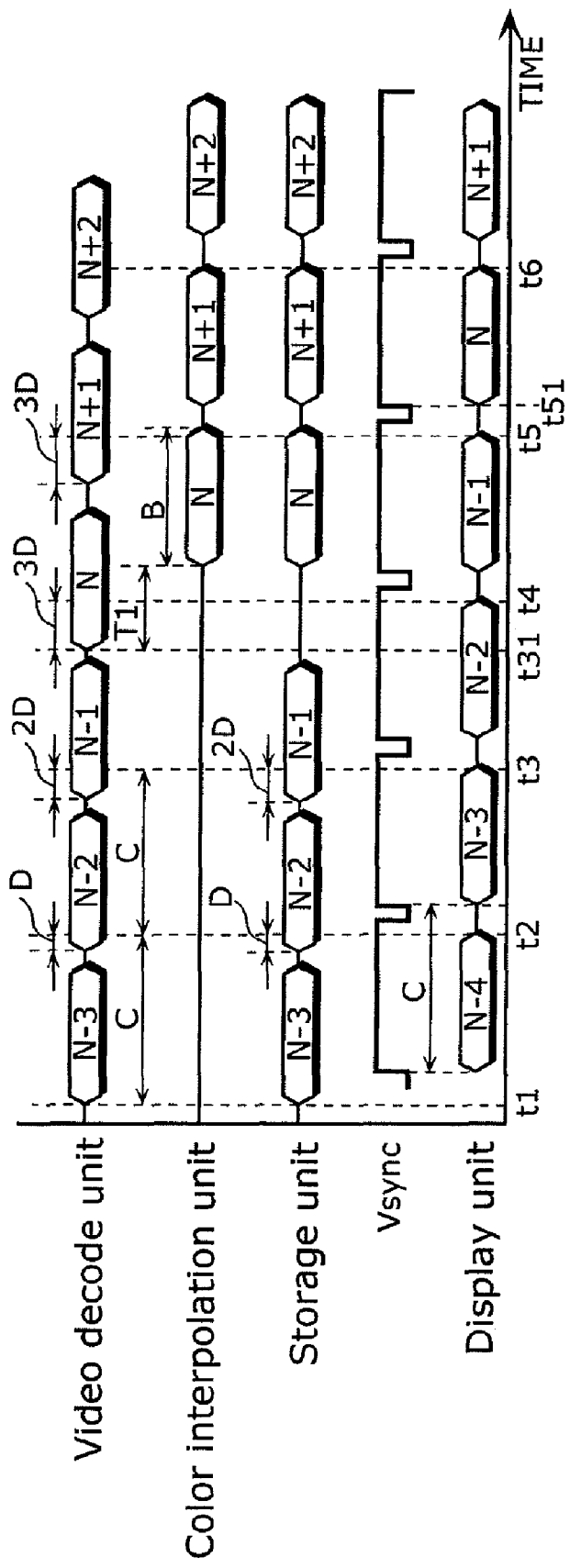
FIG. 11 is a timing chart showing the case where the temporally continuous normal photographic coded data NSD and high-speed photographic coded data HSD are reproduced continuously.

FIG. 11 is a timing chart showing the case where the temporally continuous normal photographic coded data NSD and high-speed photographic coded data HSD are reproduced continuously. Hexagons shown in FIG. 11 indicates the same as the hexagons shown in FIG. 7A, thus a detailed description thereof is not repeated here.

In FIG. 11, the hexagons in the row of "Video decode unit" each indicate a coded data item. Each of the (N−3)th to (N−1)th coded data items is a normal coded data item. Each of the Nth to (N+1)th coded data items is a high-speed coded data item. Specifically, the video decode unit 101 starts decoding of the (N−2)th to (N−1)th coded data items, which are normal coded data items, and the Nth coded data item, which is a high-speed coded data item, with timings which are ahead of predetermined timings.

This provides the same effect as the first embodiment even in the case where the beginning high-speed coded data item is included in coded data items which are decoded with timings which are brought forward.

In other words, this makes it possible to seamlessly reproduce the temporally continuous normal photographic coded data NSD and high-speed photographic coded data HSD with temporal continuity. This means that it is possible to seamlessly reproduce video based on coded data of two different types without losing temporal continuity. This prevents a user watching the video from feeling unpleasantness while the video being reproduced is based on the coded data of two different types.

Figure 12A:
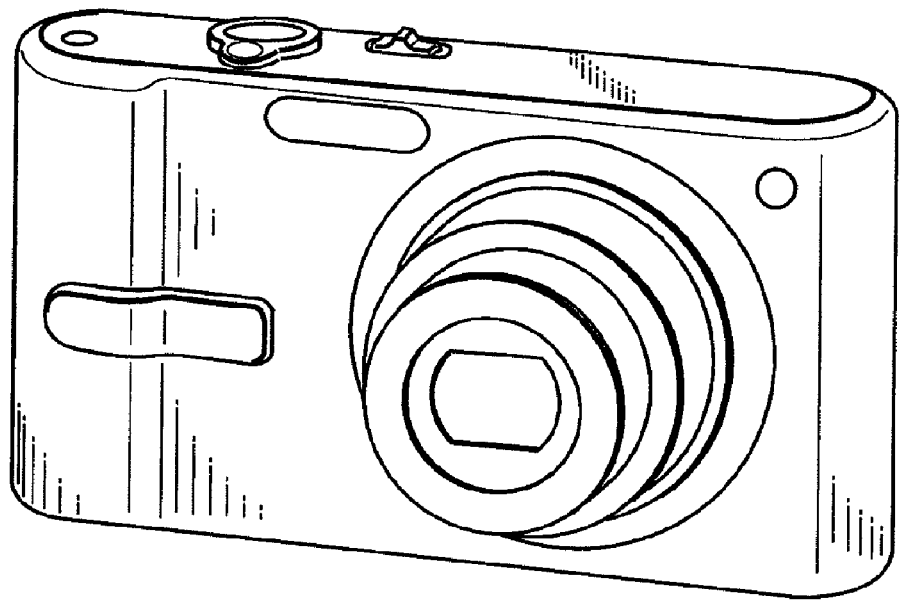
FIG. 12A is an outline view of the photography apparatus 1000 as a digital still camera.
Figure 12B:
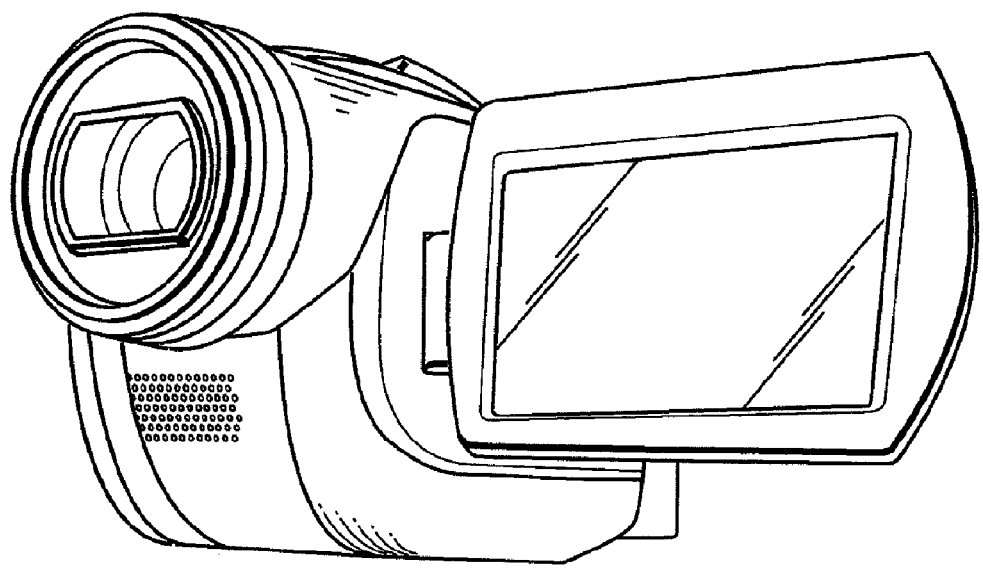
FIG. 12B is an outline view of the photography apparatus 1000 as a digital video camera.

FIG. 12A is an outline view of the photography apparatus 1000 as a digital still camera. FIG. 12B is an outline view of the photography apparatus 1000 as a digital video camera.

(Others)

According to the present invention, the processing in which some of coded data items among coded data items to be processed is described above. The present invention is not limited to this. Decoding of all the coded data items to be processed may be started with timings which are ahead of predetermined timings by the time necessary for display described above (for example, three times of adjustable time D). This also provides the same effect as the first embodiment.

The present invention may be also embodied as a program which causes a computer to execute the steps shown in FIG. 4, 8, 9, or 10. The present invention may be also embodied as a computer-readable recording medium which stores the program or an integrated circuit.

The embodiments disclosed herein are exemplary in all respects and should never be considered limiting. The scope of the present invention is indicated not by the description above but by the claims, and is intended to include any modification within the scope and the sense of equivalents of the claims.

INDUSTRIAL APPLICABILITY

The technique of the video reproduction apparatus according to the present invention makes it possible to seamlessly reproduce coded data, which is recorded first in normal photographic 20 mode and then in high-speed photographic mode, without losing temporal continuity. Thus, the present invention is applicable to photography using digital video cameras or digital still cameras which use a technique of high-speed photography.

What is claimed is:

1. A video reproduction apparatus which reproduces a video using first coded data items and second coded data items, the first coded data items being YUV data items obtained by performing color interpolation of respective RAW data items and then individually coded, the respective RAW data items obtained from an imaging device, and the second coded data items being the RAW data items individually coded, said video reproduction apparatus comprising:

a decode unit configured to decode the first coded data items and subsequently the second coded data items;

a storage unit in which data is stored;

a color interpolation unit configured to convert a RAW data item to a YUV data item;

a display unit configured to display updated images at predetermined intervals; and a control unit configured to control timings with which said decode unit starts the decoding, wherein the timings with which the decoding of the respective first coded data items is started are predetermined, the timings with which the decoding of the respective second coded data items is started are predetermined, said control unit is configured to have control over said decode unit so as to cause said decode unit to start the decoding of a part of the first coded data items with timings brought forward ahead of the predetermined timings so that said decode unit starts the decoding a beginning one of the second coded data items with a timing which is ahead of corresponding one of the predetermined timings by a time necessary for display, the time necessary for display being a period of time necessary for said display unit to seamlessly display images obtained from the respective first coded data items and the respective second coded data items, said decode unit is configured to sequentially decode the first coded data items under the control of said control unit, store the YUV data items in the storage unit in an order of the decoding, and sequentially decode the second coded data items, the YUV data items being obtained by the decoding, said color interpolation unit is configured to convert the RAW data items to YUV data items and store the YUV data items in said storage unit in an order of the converting, the RAW data items being obtained by the sequential decoding of the second coded data items, and said display unit is configured to display images that are based on the respective YUV data items stored in said storage unit in an order of the storing of the YUV data items corresponding to the images in said storage unit.

2. The video reproduction apparatus according to claim 1, wherein the first coded data items are N coded data items in a predetermined sequence, where N is a natural number, and the part of the first coded data items are a plurality of consecutive data items including an Nth first coded data item among the first coded data items.

3. The video reproduction apparatus according to claim 2, wherein said control unit is configured to have control over said decode unit so as to cause said decode unit to start the decoding of the beginning one of the second coded data items with a timing which is ahead of the corresponding one of the predetermined timings so that said decode unit starts the decoding of the beginning one of the second coded data items with the timing which is ahead of the corresponding one of the predetermined timings by the time necessary for display.

4. The video reproduction apparatus according to claim 1, wherein the first coded data items are N coded data items in a predetermined sequence, where N is a natural number, wherein said control unit is configured to calculate (a) an adjustable time which is a period of time by which the said control unit causes said decode unit to start the decoding of each of one or more of the first coded data items in the part of the first coded data items with timings ahead of corresponding predetermined timings and (b) a number K of the first coded data items to be decoded with timings brought forward, the adjustable time being calculated using (i) a display updating time necessary for said display unit to display an updated image and (ii) a decode time necessary for said decode unit to decode a first coded data item, and the number K of the first coded data items being calculated using (iii) a conversion time necessary for said color interpolation unit to convert a RAW data item to a YUV data item and (iv) the calculated adjustable time, where K is a natural number, and said control unit is configured to have control over said decode unit so as to cause said decode unit to start the decoding of each of the consecutive K first coded data items including the Nth first coded data item among the first coded items with the timings brought ahead of corresponding predetermined timings.

5. A digital camera comprising:

the video reproduction apparatus according to claim 1, and a data storage unit in which first coded data items and second coded data items are stored, the first coded data items being YUV data items obtained by performing color interpolation of respective RAW data items and then individually coded, the respective RAW data items obtained from an imaging device, and the second coded data items being the RAW data items individually coded.

6. A semiconductor integrated circuit which is connected to a memory and causes a display unit to display a video using first coded data items and second coded data items, the first coded data items being YUV data items obtained by performing color interpolation of respective RAW data items and then individually coded, the respective RAW data items obtained from an imaging device, and the second coded data items being the RAW data items individually coded, said semiconductor integrated circuit comprising:

a decode circuit decoding the first coded data items and subsequently the second coded data items;

a color interpolation circuit converting a RAW data item to a YUV data item; and a control circuit controlling timings with which said decode circuit starts the decoding, wherein the timings with which the decoding of the respective first coded data items is started are predetermined, the timings with which the decoding of the respective second coded data items is started are predetermined, said control circuit has control over said decode circuit so as to cause said decode circuit to start the decoding of a part of the first coded data items with timings brought forward ahead of the predetermined timings so that said decode circuit starts the decoding a beginning one of the second coded data items with a timing which is ahead of corresponding one of the predetermined timings by a time necessary for display, the time necessary for display being a period of time necessary for the display unit to seamlessly display images obtained from the respective first coded data items and the respective second coded data items, said decode circuit sequentially decodes the first coded data items under the control of said control circuit, stores the YUV data items in the memory in an order of the decoding, and sequentially decodes the second coded data items, the YUV data items being obtained by the decoding, said color interpolation circuit converts the RAW data items to YUV data items and stores the YUV data items in the memory in an order of the converting, the RAW data items being obtained by the sequential decoding of the second coded data items, and said semiconductor integrated circuit causes the display unit to display images that are based on the respective YUV data items stored in the memory in an order of the storing of the YUV data items corresponding to the images in the memory.

7. A method for video reproduction performed by a video reproduction apparatus which is connected to a memory, includes a decode unit, and causes a display unit to display a video using first coded data items and second coded data items, the first coded data items being YUV data items obtained by performing color interpolation of respective RAW data items and then individually coded, the respective RAW data items obtained from an imaging device, and the second coded data items being the RAW data items individually coded, said method for video reproduction comprising:

decoding the first coded data items and subsequently the second coded data items, said decoding performed by the decode unit;

performing color interpolation by which a RAW data item are converted to a YUV data item;

controlling timings with which the decode unit starts the decoding, wherein the timings with which said decoding of the respective first coded data items is started are predetermined, the timings with which said decoding of the respective second coded data items is started are predetermined, said controlling causes the decode unit to start said decoding of a part of the first coded data items with timings brought forward ahead of the predetermined timings so that the decode unit starts said decoding of a beginning one of the second coded data items with a timing which is ahead of corresponding one of the predetermined timings by a time necessary for display, the time necessary for display being a period of time necessary for the display unit to seamlessly display images obtained from the respective first coded data items and the respective second coded data items, the decode unit sequentially decodes the first coded data items under control in said controlling, stores the YUV data items in the memory in an order of the decoding, and sequentially decodes the second coded data items, the YUV data items being obtained by said decoding, said performing color interpolation has the RAW data items converted to YUV data items and has the YUV data items stored in the memory in an order of the converting, the RAW data items being obtained by the sequential decoding of the second coded data items, and said method for video reproduction further comprises displaying which causes the display unit to display images that are based on the respective YUV data items stored in the memory in an order of the storing of the YUV data items corresponding to the images in the memory.

* * * * *